United States Patent
Bastian

[11] 3,865,843
[45] Feb. 11, 1975

[54] 4-OXO-4H-BENZO[4,5]CYCLOHEPTA[1,2-B]THIOPHENE
[75] Inventor: Jean-Michel Bastian, Therwil, Switzerland
[73] Assignee: Sandoz Ltd., Basle, Switzerland
[22] Filed: Apr. 2, 1973
[21] Appl. No.: 347,061

[30] Foreign Application Priority Data
Apr. 7, 1972 Switzerland............ 5133/72

[52] U.S. Cl..... 260/332.2 A, 260/332.3 R, 424/275
[51] Int. Cl. .................. C07d 63/18, A61k 27/00
[58] Field of Search... 260/332.2 A, 332.3 P, 329 F, 260/332.5

[56] References Cited
UNITED STATES PATENTS
3,464,983  9/1969  Jucker et al. .............. 260/240
3,780,061  12/1973 Allais et al. ............... 260/332.2

Primary Examiner—Henry R. Jiles
Assistant Examiner—C. M. S. Jaisle
Attorney, Agent, or Firm—Gerald D. Sharkin; Richard E. Vila; Thomas O. McGovern

[57] ABSTRACT

The invention concerns novel 4-oxo-4H-benzo[4,5]cyclohepta[1,2-b]thiophene derivatives of the formula

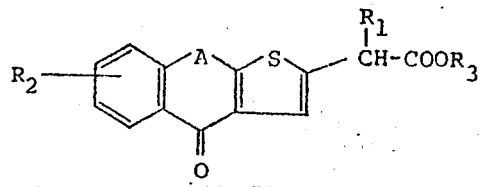

wherein
R$_1$ is hydrogen or lower alkyl,
R$_2$ is hydrogen, fluorine, chlorine, bromine, lower alkyl or lower alkoxy,
R$_2$ is hydrogen, fluorine, chlorine, bromine, lower vinylene, useful as
antiphlogistic agents.

29 Claims, No Drawings

4-OXO-4H-BENZO[4,5]CYCLOHEPTA[1,2-B]THIOPHENE DERIVATIVES

IMPROVEMENTS IN OR RELATING TO ORGANIC COMPOUNDS

The present invention relates to new 4-oxo-4H-benzo[4,5]cyclohepta[1,2-b]thiophene derivatives.

The present invention provides compounds of formula I,

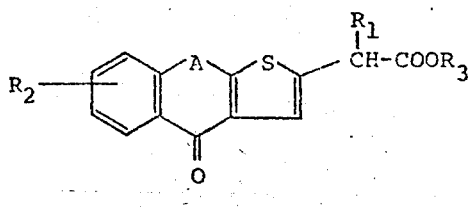

I wherein
R₁ is hydrogen or lower alkyl,
R₂ is hydrogen, fluorine, chlorine, bromine, lower alkyl or lower alkoxy,
R₃ is hydrogen or lower alkyl, and
A is ethylene or vinylene.

Further, in accordance with the invention a compound of formula I may be obtained by a process comprising a. converting the —CN group into the —COOR₃ group, wherein R₃ is as defined above, in a compound of formula II,

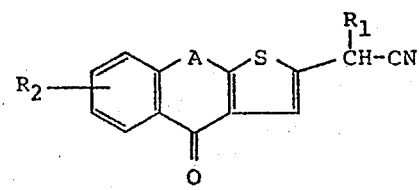

II wherein A, R₁ and R₂ are as defined above, or b. reacting a compound of formula Ib,

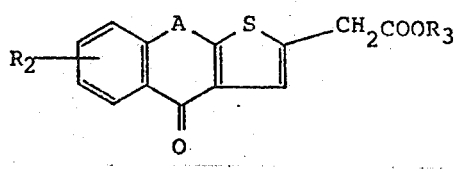

Ib wherein R₂, R₃ and A are as defined above, with a compound of formula III,

R₁'—X

III wherein
R₁' is lower alkyl, and
X is the acid radical of a reactive ester,
to produce a compound of formula Ia,

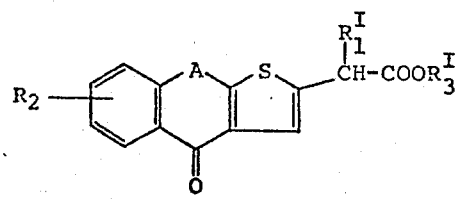

Ia wherein
R₁', R₂ and A are as defined above, and
R₃' is lower alkyl, or c. oxidizing a compound of formula IV,

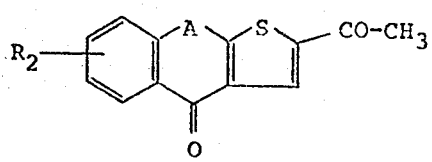

IV wherein R₂ and A are as defined above, with a thallium (III) salt of a strong, nonoxidizable acid in the presence of a strong acid and an alcohol of formula V,

R₃''—OH

V wherein R₃'' is a primary lower alkyl group, to produce a compound of formula Ic,

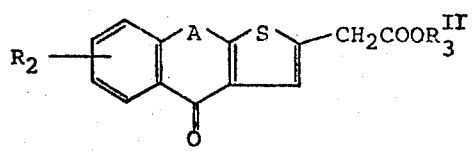

Ic wherein R₂, A and R₃'' are as defined above, or d. hydrolyzing a compound of formula Ie,

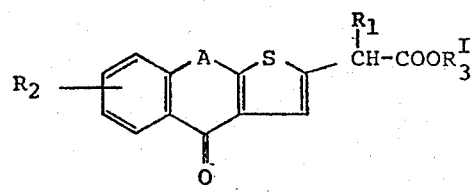

Ie wherein R₁, R₂, R₃' and A are as defined above, to produce a compound of formula Id,

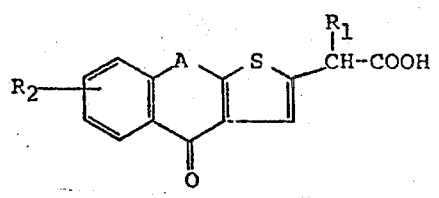

Id wherein R₁, R₂ and A are as defined above.

R₃ in the compounds of formula I preferably signifies hydrogen. The substituent R₂ preferably denotes hydrogen or halogen of atomic number from 9 to 35. When R₂ is the latter it is especially chlorine. When R₁ is a lower alkyl group, this may, for example, contain 1 to 4 carbon atoms and preferably denotes the methyl or ethyl group. When R₃ is lower alkyl, this preferably contains 1 to 5 carbon atoms. The substituent R₂ preferably is in the 6 or 7 position of the ring structure. When R₂ is lower alkoxy or alkyl, these groups preferably contain 1 to 3 carbon atoms and especially signify methoxy or methyl.

Process variant (a) may be effected in known manner. For example, a compound of formula II may be allowed to react with water or a mixture of an alcohol of formula V$a$, $$R_3—OH \quad Va$$

wherein $R_3$ is as defined above, and water. The reaction may, for example, be effected in the presence of a strongly acidic or strongly basic catalyst, e.g., a strong mineral acid such as concentrated hydrochloric acid, 20 to 75 percent sulphuric acid or phosphoric acid, or a strong organic acid, e.g., an organic sulphonic acid, or, e.g., an alkali metal hydroxide solution, for example a 10 to 50 percent sodium or potassium hydroxide solution.

For the direct conversion of the —CN group into the carboxyl group, a compound of formula II may be heated in the presence of an acid catalyst preferably to a temperature from 60° to 120°C, preferably to the reflux temperature of the reaction mixture, or in the presence of a strongly basic catalyst preferably to a temperature from 20° to 150°C. The direct conversion reaction may be effected in water, alternatively in water and an inert water-miscible organic solvent, e.g., an alcohol such as ethanol, amyl alcohol or ethylene glycol, or an ether such as dioxane, or acetic acid.

For the conversion of the —CN group into an ester group, the compounds of formula II may be reacted in an alcohol of formula V$a$ containing an amount of water which is preferably equivalent to the amount of compound of formula II used. Any of the above-mentioned solvents may be present and the reaction is preferably effected in the presence of an acid or basic catalyst for example as mentioned above, preferably at a temperature of about 50° to 100°C. If desired, the compounds of formula II may first be converted with the alcohol into the corresponding imino ethers which are subsequently hydrolyzed to the esters of formula I with a preferably equivalent amount of water.

Process variant (b) may, for example, be effected by reacting a compound of formula I$b$ with a compound of formula III, preferably a compound of formula III wherein X is halogen or a mesyloxy or tosyloxy group, in an inert solvent, e.g., an aromatic hydrocarbon such as toluene or benzene, an ether such as dioxane or diethyl ether. The reaction is preferably effected in the presence of a basic condensation agent, e.g., sodium amide, potassium tert.butylate or sodium hydride, preferably at a temperature from about 25° to 100°C.

Process variant (c) may, for example, be effected in the presence of an inert strong, non-oxidizable mineral acid, preferably perchloric acid. Suitable thallium (III) salts are thallium (III) trinitrate or thallium (III) perchlorate, e.g., produced from the trinitrate in situ. Apart from an alcohol of formula V, e.g., methanol or ethanol, it is also possible to carry out the reaction in the presence of further inert organic, preferably water-miscible solvents, for example primary mono- or polyvalent lower alkanols, cyclic ethers such as dioxane, or dimethyl formamide, or aromatic hydrocarbons such as benzene or toluene. The reaction temperature may be preferably from about 0° to 50°C. In accordance with a preferred method of the process, a solution of a compound of formula IV in an aromatic hydrocarbon or lower alcohol may, for example, be slowly added at room temperature to a solution containing a 1- to 1.5-fold molar amount of thallium (III) trinitrate and a 1- to 10-fold molar amount of 70 percent aqueous perchloric acid dissolved in a lower alcohol such as methanol or ethanol, and conveniently up to a 15-fold molar amount of sodium perchlorate, and the mixture is allowed to react at room temperature for about 10 to 40 hours.

Process variant (d) may be effected in known manner for hydroylsis reactions. The reaction may, for example, be effected in the presence of a strongly acidic or strongly basic catalyst, e.g., a strong mineral acid such as concentrated hydrochloric acid, 20 to 75 percent sulphuric acid or phosphoric acid, or a strong organic acid, e.g., an organic sulphonic acid, or, e.g., an alkali metal hydroxide solution, for example a 10 to 50 percent sodium or potassium hydroxide solution. The reaction may be effected in water, conveniently in the presence of an inert water-miscible organic solvent. Acid hydrolysis may, for example, be effected at a temperature from 60° to 120°C, preferably at the reflux temperature of the reaction mixture. Alkaline hydrolysis may be effected at a temperature from about 20° to 150°C.

The resulting compounds of formula I may be isolated from the reaction mixture and purified in known manner. Free acid forms of compounds of formula I$d$ may be converted into salt forms in conventional manner and vice versa.

The starting materials may, for example, be obtained as follows:

a'. A compound of formula II$a$,

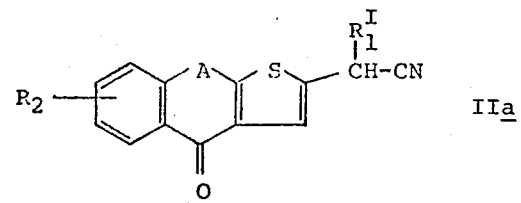

wherein $R_1'$, $R_2$ and A are as defined above, may, for example, be obtained by reacting a compound of formula II$b$,

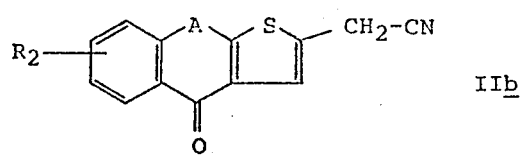

wherein $R_2$ and A are as defined above, with a compound of formula III, e.g., under the reaction conditions described in process variant (b).

b'. A compound of formula II may, for example, be obtained by reacting a compound of formula VI,

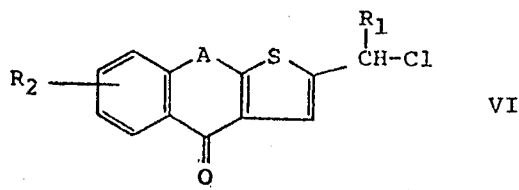

wherein $R_1$, $R_2$ and A are as defined above, with a metal cyanide. It is preferred to use an alkali metal cyanide, e.g., sodium or potassium cyanide, or copper (I) cyanide. The reaction may, for example, be effected in an inert solvent such as water, acetone, a lower alcohol or dimethyl formamide, or a mixture of water and one of the organic solvents mentioned above, optionally with the addition of a metal iodide such as sodium or potassium iodide. The reaction temperature may be from 10° to 150°C, preferably between 50° and 120°C.

c'. A compound of formula VI may, for example, be obtained by chloroalkylation of a compound of formula VII,

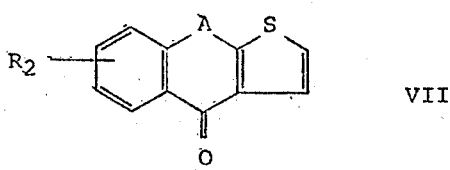

VII wherein $R_2$ and A are as defined above, for example by reacting a mixture of a compound of formula VII with an aldehyde of formula VIII,

VIII wherein $R_1$ is as defined above, or a polymer thereof in an acid solution, e.g. in aqueous hydrochloric acid or in acetic acid, while passing hydrogen chloride gas therethrough, or in a concentrated hydrochloric acid solution, conveniently at a temperature from about −20° to +80°C, preferably −10° and +50°C.

d'. A compound of formula IV may, for example, be obtained by acylating a compound of formula VII. The acylation may be effected in known manner, e.g., by reaction with acetic anhydride in the presence of a catalyst, e.g., orthophosphoric acid, preferably at a temperature from about 50° to 150°C, or with an acetyl halide in the presence of a Friedel-Crafts catalyst, e.g., aluminum trichloride, under the reaction conditions of a Friedel-Crafts acylation.

Insofar as the production of the starting materials is not particularly described, these are known or may be produced in accordance with known processes, or in a manner analogous to the processes described herein or to known processes.

The compounds of formula I have not been described in the literature.

The compounds of formula I are useful because they possess pharmacological activity in animals. In particular, the compounds of formula I are useful as antiphlogistic agents, useful for the inhibition of exudation from inflammations or edemas, as indicated in standard tests, e.g., the Carrageen paw edema test in rats on p.o. administration of 1 to 20 mg/kg animal body weight, of the compounds, and in the granuloma cyst test in rats on p.o. administration of 3 to 50 mg/kg animal body weight, of the compounds.

For the above mentioned use the dosage will, of course, vary depending on the compound employed, mode of administration and therapy desired. However, in general, satisfactory results are obtained when administered at a daily dosage of from 1 mg to about 50 mg per kg animal body weight, conveniently given in divided doses 2 to 4 times a day in sustained release form. For the larger mammal, the total daily dosage is in the range from about 50 to about 300 mg, and dosage forms suitable for oral administration comprise from about 12 mg to about 150 mg of the compounds admixed with a solid or liquid pharmaceutical carrier or diluent.

Specific examples of perorally administered daily dosages, at which satisfactory results are obtained, are:

i. 9,10-dihydro-4-oxo-4H-benzo[4,5]cyclohepta[1,2-b]thiophene-2-acetic acid, from 1 to 50, e.g., 10 to 30, mg/kg animal body weight for animals in general, e.g., rats, and for the larger mammals from 50 to 300, e.g., 150 mg, and ii. 4-oxo-4H-benzo[4,5]cyclohepta[1,2-b]thiophene-2-acetic acid from 1 to 50, e.g., 3 to 30, mg/kg animal body weight, for animals in general, e.g., rats, and for the larger mammals from 50 to 300, e.g., 150 mg.

4-Oxo-4-H-benzo[4,5]cyclohepta[1,2-b]thiophene-2-acetic acid has particularly interesting properties.

The compounds of formula I may be administered in free acid form. The compounds of formula I*d* may alternatively be administered in pharmaceutically acceptable salt form. Such salt forms exhibit the same order of activity as the free froms and are readily prepared in conventional manner. Representative salt forms include alkali metal salt forms such as the sodium salt. A pharmaceutical composition may comprise a compound of formula I, in free acid form or in pharmaceutically acceptable salt form, in association with a pharmaceutical carrier or diluent. Such compositions may be prepared by conventional techniques to be in the form of, for example, capsules, tablets, suppositories, suspensions or solutions, for enternal or parenteral administration. Aside from the usual pharmaceutical diluents or carriers, e.g., water, alcohols, natural or hardened oils and waxes, these pharmaceutical compositions may contain suitable preserving, stabilizing, wetting solubilizing, sweetening, flavouring or colouring agents.

In one class of compounds of formula I, $R_2$ is hydrogen, fluorine, bromine, chlorine or lower alkoxy.

In another class of compounds of formula I, A is vinylene.

In the following non-limitative Examples all temperatures are indicated in degrees Centigrade.

EXAMPLE 1

9,10-dihydro-4-oxo-4H-benzo[4,5]-cyclohepta[1,2-b]thiophene-2-acetic acid [process variant a) ]

A mixture of 19.0 g of 9,10-dihydro-4-oxo-4H-benzo[4,5]cyclohepta[1,2-b]thiophene-2-acetonitrile, 20 cc of glacial acetic acid, 20 cc of concentrated sulphuric acid and 20 cc of water is heated to the boil for 4 hours while stirring. After cooling, the reaction mixture is diluted with 250 cc of water, is extracted with methylene chloride and the resulting acid is extracted from the methylene chloride extracts with an 8 percent caustic soda solution. The pH of the aqueous basic solution is adjusted to 3 by the addition of 2 N hydrochloric acid at a temperature of 10° to 15°, the resulting suspension is extracted with methylene chloride, the extracts are dried over magnesium sulphate and the solvent is removed by evaporation. The solid residue is recrystallized from benzene. The title compound has a M.P. of 138° to 140° (decomp.).

The 9,10-dihydro-4-oxo-4-H-benzo[4,5]-cyclohepta[1,2-b]thiophene-2-acetonitrile, used as starting material, may be produced as follows:

a. A mixture of 100 g of 9,10-dihydro-4-H-benzo[4,5]cyclohepta[1,2-b]thiophen-4-one in 700 cc of concentrated hydrochloric acid and 57 cc of a 40 percent formaldehyde solution is saturated with hydrogen chloride for 8 hours with vigorous stirring and cooling (10° to 15°). The mixture is allowed to stand at room temperature for 14 to 18 hours, is poured on 2.5 litres of ice water and extracted several times with chloroform. After drying over calcium chloride, the extracts are concentrated by evaporation and the resulting 2-chloromethyl-9,10-dihydro-4-oxo-4H-benzo[4,5]cyclohepta[1,2-b]thiophene is recrystallized from ether. M.P. 82° to 83°.

b. 20 g of finely pulverized sodium cyanide and 1 g of sodium iodide are added to a solution of 100 g of 2-chloromethyl-9,10-dihydro-4-oxo-4H-benzo[4,5]cyclohepta[1,2-b]thiophene in 800 cc of N,N-dimethyl formamide. The mixture is stirred at 100° for 1½ hours, is cooled to 20° and poured on 4 litres of water and 2 litres of ether. The mixture is stirred thoroughly for one hour and the ether solution is separated. The 9,10-dihydro-4-oxo-4H-benzo[4,5]cyclohepta[1,2-b]thiophene-2-acetonitrile, obtained after evaporation of the solvent, crystallizes from ether. M.P. 92° to 94°.

The following compounds of formula I may also be produced in a manner analogous to that described in Example 1 from the corresponding nitriles of formula II:

6-chloro-9,10-dihydro-α-methyl-4-oxo-4H-benzo[4,5]cyclohepta[1,2-b]thiophene-2-acetic acid,

| Analysis: | calculated: | 60.0 % C | 4.1 % H | 10.0 % S |
|---|---|---|---|---|
| | found: | 59.9 % C | 4.3 % H | 10.2 % S |

6-fluoro-4oxo-4H-benzo[4,5]cyclohepta[1,2-b]thiophene-2-acetic acid,

| Analysis: | calculated: | 62.5 % C | 9.1 % H | 11.1 % S |
|---|---|---|---|---|
| | found: | 62.3 % C | 9.0 % H | 11.2 % S |

5-methyl-4-oxo-4H-benzo[4,5]cyclohepta[1,2-b]thiophene-2-acetic acid,

| Analysis: | calculated: | 67.1 % C | 4.9 % H | 11.2 % S |
|---|---|---|---|---|
| | found: | 67.4 % C | 5.0 % H | 11.1 % S |

EXAMPLE 2

4-oxo-4H-benzo[4,5]cyclohepta[1,2-b]thiophene-2-acetic acid 4-oxo-4H-benzo[4,5]cyclohepta[1,2-b]thiophene-2-acetonitrile is reacted in accordance with the process described in Example 1. M.P. of the title compound 177°–179° (from acetone).

The starting material may be obtained as follows:

a. 2-chloromethyl-4-oxo-4H-benzo[4,5]cyclohepta[1,2-b]thiophene, produced in a manner analogous to that described in Example 1a from 4H-benzo[4,5]cyclohepta[1,2-b]thiophen-4-one. M.P. 162° to 164° (methanol/ethanol).

b. 4-oxo-4H-benzo[4,5]cyclohepta[1,2-b]thiophene-2-acetonitrile, produced in a manner analogous to that described in Example 1b. M.P. 165° to 167° (benzene).

EXAMPLE 3

6-chloro-9,10-dihydro-4-oxo-4H-benzo[4,5]cyclohepta[1,2-b]thiophene-2-acetic acid 6-chloro-9,10-dihydro-4-oxo-4H-benzo[4,5]cyclohepta[1,2-b]thiophene-2-acetonitrile is reacted in a manner analogous to that described in Example 1. M.P. of the title compound 142°–143°.

The starting material, 6-chloro-9,10-dihydro-4-oxo-4H-benzo[4,5]cyclohepta[1,2-b]thiophene-2-acetonitrile, may be produced as follows:

a. A mixture of 50 g of 6-chloro-9,10-dihydro-4H-benzo[4,5]cyclohepta[1,2-b]thiophen-4-one,6.1 g of paraformaldehyde, 54 cc of glacial acetic acid, 40 cc of 85 percent phosphoric acid and 86 cc of concentrated hydrochloric acid is stirred at 80° for 5 hours, is poured on ice water and extracted with methylene chloride. The extracts are washed with water until neutral, dried over magnesium sulphate, and the solvent is removed by evaporation. 6-chloro-2-chloromethyl-9,10-dihydro-4H-benzo[4,5]cyclohepta[1,2-b]thiophen-4-one is recrystallized from ether. M.P. 80°–82°.

b. A mixture of 21.5 g of 6-chloro-2-chloromethyl-9,10-dihydro-4H-benzo[4,5]cyclohepta[1,2-b]thiophen-4-one, 4.5 g of sodium cyanide and 0.5 g of sodium iodide in 170 cc of dimethyl formamide is heated to 70° for 3 hours, is cooled, poured on water and extracted with benzene. After washing with water, drying over magnesium sulphate and removing the solvent by evaporation, 6-chloro-9,10-dihydro-4-oxo-4H-benzo[4,5]cyclohepta[1,2-b]thiophene-2-acetonitrile is crystallized from hexane/ether. M.P. 128°–130°.

EXAMPLE 4

9,10-dihydro-α-methyl-4-oxo-4H-benzo[4,5]cyclohepta[1,2-b]thiophene-2-acetic acid 9,10-dihydro-α-methyl-4-oxo-4H-benzo[4,5]cyclohepta[1,2-b]thiophene-2-acetonitrile is reacted in a manner analogous to that described in Example 1. M.P. of the title compound 118°–120°.

The 9,10-dihydro-α-methyl-4-oxo-4H-benzo[4,5]cyclohepta[1,2-b]thiophene-2-acetonitrile, used as starting material, may be produced as follows:

a. A solution of 18.5 g of 9,10-dihydro-4-oxo-4H-benzo[4,5]cyclohepta[1,2-b]thiophene-2-acetonitrile in 75 cc of benzene is added dropwise at room temperature to a suspension of 8.2 g of potassium-tert-butylate in 50 cc of absolute ether, and the mixture is stirred at room temperature for 2 hours. A solution of 11.5 g of methyl iodide in 50 cc of absolute ether is then added dropwise to the reaction mixture at room temperature, stirring is continued for one hour and the entire material is poured on 300 cc of ice water. The organic phase is separated, the aqueous solution is extracted with methylene chloride, the combined extracts are washed with water, dried over magnesium sulphate, and the solvent is removed by evaporation. The residue is used without further purification.

EXAMPLE 5

7-chloro-9,10-dihydro-4-oxo-4H-benzo[4,5]cyclohepta[1,2-b]thiophene-2-acetic acid 7-chloro-9,10-dihydro-4-oxo-4H-benzo[4,5]cyclohepta[1,2-b]thiophene-2-acetonitrile is reacted in a manner analogous to that described in Example 1. M.P. of the title compound 184°–185° (from benzene/ether).

The 7-chloro-9,10-dihydro-4-oxo-4H-benzo[4,5]cyclohepta[1,2-b]thiophene-2-acetonitrile, used as starting material, may be produced as follows:

a. 7-chloro-2-chloromethyl-9,10-dihydro-4H-benzo[4,5]cyclohepta[1,2-b]thiophen-4-one, produced in a manner analogous to that described in Example 3a from 7-chloro-9,10-dihydro-4H-benzo[4,5]cyclohepta[1,2-b]thiophen-4-one. M.P. 133°–135° (from ether).

b. 7-chloro-9,10-dihydro-4-oxo-4H-benzo[4,5]cyclohepta[1,2-b]thiophene-2-acetonitrile, produced in a manner analogous to that described in Example 3b. M.P. 146°–148° (from benzene).

EXAMPLE 6

9,10-dihydro-α-methyl-4-oxo-4H-benzo[4,5]cyclohepta[1,2-b]thiophene-2-acetic acid ethyl ester A solution of 20.7 g of 9,10-dihydro-α-methyl-4-oxo-4H-benzo[4,5]cyclohepta[1,2-b]thiophene-2-acetonitrile in 110 cc of absolute ethanol is saturated with hydrogen chloride at room temperature, is boiled at reflux for 24 hours and evaporated to dryness. the residue is taken up in 75 cc of ethanol and 2.2 cc of water, boiling is effected at reflux for 2½ hours and the mixture is again evaporated to dryness. The residue is taken up in benzene, washed with water, dried over sodium sulphate, and the solvent is removed by evaporation. The resulting title compound is purified by distillation. B.P. 185°–190° at 0.02 mm of Hg.

The following compounds of formula I may also be obtained in a manner analogous to that described in Example 6 by solvolysis of the corresponding acetonitriles of formula II:

6-fluoro-4-oxo-4H-benzo[4,5]cyclohepta[1,2-b]thiophene-2-acetic acid ethyl ester,

| Analysis: | calculated: | 64.5 % C | 4.1 % H | 10.1 % S |
|---|---|---|---|---|
| | found: | 64.7 % C | 4.0 % H | 9.8 % S |

5-methyl-4-oxo-4H-benzo[4,5]cyclohepta[1,2-b]thiophene-2-acetic acid ethyl ester,

| Analysis: | calculated: | 69.2 % C | 5.2 % H | 10.2 % S |
|---|---|---|---|---|
| | found: | 69.0 % C | 5.3 % H | 10.4 % S |

EXAMPLE 7

9,10-dihydro-4-oxo-4H-benzo[4,5]cyclohepta[1,2-b]thiophene-2-acetic acid ethyl ester 9,10-dihydro-4-oxo-4H-benzo[4,5]cyclohepta[1,2-b]thiophene-2-acetonitrile is reacted in a manner analogous to that described in Example 6 and the resulting title compound is purified by distillation. B.P. 185°–195° at 0.04 mm of Hg.

EXAMPLE 8

4-oxo-4H-benzo[4,5]cyclohepta[1,2-b]thiophene-2-acetic acid ethyl ester 4-oxo-4H-benzo[4,5]cyclohepta[1,2-b]thiophene-2-acetonitrile is reacted as described in Example 6 to produce the title compound. B.P. 150°–160° at 0.01 mm of Hg.

EXAMPLE 9

6-chloro-9,10-dihydro-4-oxo-4H-benzo[4,5]cyclohepta[1,2-b]thiophene-2-acetic acid ethyl ester The title compound is produced in accordance with Example 6, from 5.3 g of 6-chloro-9,10-dihydro-4-oxo-4H-benzo[4,5]cyclohepta[1,2-b]thiophene-2-acetonitrile in 85 cc of ethanol. B.P. 200°–205° at 0.02 mm of Hg.

EXAMPLE 10

6-chloro-9,10-dihydro-α-methyl-4-oxo-4H-benzo[4,5]cyclohepta[1,2-b]thiophene-2-acetic acid ethyl ester The title compound is produced in accordance with Example 6, from 5.2 g of 6-chloro-9,10-dihydro-α-methyl-4-oxo-4H-benzo[4,5]cyclohepta[1,2-b]thiophene-2-acetonitrile in 80 cc of ethanol. B.P. 197°–199° at 0.03 mm of Hg.

The 6-chloro-9,10-dihydro-α-methyl-4-oxo-4H-benzo[4,5]cyclohepta[1,2-b]thiophene-2-acetonitrile, used as starting material, may be produced in a manner analogous to that described in Example 4a, from 6-chloro-9,10-dihydro-4-oxo-4H-benzo[4,5]cyclohepta[1,2-b]thiophene-2-acetonitrile. M.P. 105°–112° (from benzene/hexane).

EXAMPLE 11

7-chloro-9,10-dihydro-4-oxo-4H-benzo[4,5]cyclohepta[1,2-b]thiophene-2-acetic acid ethyl ester The title compound is produced in accordance with Example 6, from 10.0 g of 7-chloro-9,10-dihydro-4-oxo-4H-benzo[4,5]cyclohepta[1,2-b]thiophene-2-acetonitrile in 160 cc of ethanol. B.P. 215°–218° at 0.04 mm of Hg.

EXAMPLE 12

4-oxo-4H-benzo[4,5]cyclohepta[1,2-b]thiophene-2-acetic acid methyl ester [process variant c)]

36.0 g of thallium trinitrate trihydrate, 32.0 g of sodium perchlorate, 16.0 cc of 70 percent perchloric acid and 260 cc of methanol are stirred at room temperature for 15 minutes. A solution of 12.0 g of 2-acetyl-4H-benzo[4,5]cyclohepta[1,2-b]thiophen-4-one in 230 cc of benzene is added dropwise to this solution, the mixture is stirred at room temperature for a further 40 hours, the precipitate is filtered off and the filtrate is poured on 2 liters of water. Extraction is effected with methylene chloride, the extracts are washed with water and with a common salt solution, are dried over sodium sulphate, and the solvent is removed by evaporation. The title compound is recrystallized from acetone/hexane. M.P. 72°–74°.

The 2-acetyl-4H-benzo[4,5]cyclohepta[1,2-b]thiophen-4-one, used as starting material, may be produced as follows:

a. 5 cc of 84 percent phosphoric acid are added dropwise to a solution of 10.0 g of 4H-benzo[4,5]cyclohepta[1,2-b]thiophen-4-one in 50 cc of acetic anhydride. The reaction solution is stirred at 110° for 1 hour, is poured on ice water and extracted with chloroform. The extracts are washed with water, dried over sodium sulphate and evaporated to dryness. The resulting 2-acetyl compound is crystallized from benzene. M.P. 156°–159°.

The following compounds of formula I may also be obtained in a manner analogous to that described in Example 12 by oxidation of the corresponding compounds of formula IV:

9,10-dihydro-4-oxo-4H-benzo[4,5]cyclohepta[1,2-b]thiophene-2-acetic acid ethyl ester,
B.P. 185°–195°/0.04 mm Hg;

7-chloro-9,10-dihydro-4-oxo-4H-benzo[4,5]cyclohepta[1,2-b]thiophene-2-acetic acid ethyl ester,
B.P. 215°–218°/0.04 mm Hg;

9,10-dihydro-6-methoxy-4-oxo-4H-benzo[4,5]cyclohepta[1,2-b]thiophene-2-acetic acid methyl ester, analysis:

| | | | |
|---|---|---|---|
| calculated | C 64.5 | H 5.1 | S 10.1 % |
| found | C 64.2 | H 5.3 | S 10.1 % |

6-fluoro-4-oxo-4H-benzo[4,5]cyclohepta[1,2-b]thiophene-2-acetic acid methyl ester, analysis:

| | | | |
|---|---|---|---|
| calculated | C 63.5 | H 3.7 | S 10.6 % |
| found | C 63.7 | H 3.9 | S 10.3 % |

5-methyl-4-oxo-4H-benzo[4,5]cyclohepta[1,2-b]thiophene-2-acetic acid methyl ester, analysis:

| | | | |
|---|---|---|---|
| calculated | C 68.5 | H 4.7 | S 10.7 % |
| found | C 68.4 | H 4.5 | S 10.8 % |

EXAMPLE 13

6-chloro-9,10-dihydro-4-oxo-4H-benzo[4,5]cyclohepta[1,2-b]thiophene-2-acetic acid methyl ester The title compound is produced in a manner analogous to that described in Example 12, from 12.0 g of 2-acetyl-6-chloro-9,10-dihydro-4H-benzo[4,5]cyclohepta[1,2-b]thiophen-4-one, 34.0 g of thallium trinitrate trihydrate, 30.0 g of sodium perchlorate, 16 cc of 70 percent perchloric acid, 250 cc of methanol and 250 cc of benzene. M.P. 109°–110° (from benzene/hexane).

The starting material, 2-acetyl-6-chloro-9,10-dihydro-4H-benzo[4,5]cyclohepta[1,2-b]thiophen-4-one, is produced in a manner analogous to that described in Example 12a, from 6-chloro-9,10-dihydro-4H-benzo[4,5]cyclohepta[1,2-b]thiophen-4-one. M.P. 158°–159° (from benzene).

EXAMPLE 14

9,10-dihydro-4-oxo-4H-benzo[4,5]cyclohepta[1,2-b]thiophene-2-acetic acid [process variant d)]

A mixture of 15.0 g of 9,10-dihydro-4-oxo-4H-benzo[4,5]cyclohepta[1,2-b]thiophene-2-acetic acid ethyl ester, 5.5 g of sodium hydroxide and 150 cc of n-butanol is stirred at the boil for 24 hours. After cooling, the mixture is poured on 1 liter of water, the aqueous solution is washed twice with benzene, and the pH of the solution is adjusted to 3 by the addition of 5 N hydrochloric acid. The precipitated acid is extracted with methylene chloride, the extracts are washed with water, dried over magnesium sulphate, and the solvent is removed by evaporation. The solid residue is recrystallized from benzene. The title compound has a M.P. of 138°–140° (decomp.).

EXAMPLE 15

4-oxo-4H-benzo[4,5]cyclohepta[1,2-b]thiophene-2-acetic acid

A suspension of 12 g of 4-oxo-4H-benzo[4,5]cyclohepta[1,2-b]thiophene-2-acetic acid ethyl ester in 70 cc of water and 140 cc of concentrated hydrochloric acid is boiled at reflux for 48 hours while stirring vigorously. After cooling, the mixture is extracted with methylene chloride and the extracts are washed with water. The methylene chloride solution is then extracted thrice with an 8 percent caustic soda solution, the basic aqueous solution is washed with ether and acidified at 10° to 15° by the addition of 5 N hydrochloric acid. The acid obtained as an oil is extracted with methylene chloride, the extracts are washed with water, dried over magnesium sulphate, concentrated by evaporation, and the residue is recrystallized from acetone. M.P. of the title compound 177°–179°.

The following acids may also be obtained in a manner analogous to that described in Example 14 or 15 by hydrolysis of the corresponding esters in parentheses:

6-chloro-9,10-dihydro-α-methyl-4-oxo-4H-benzo[4,5]cyclohepta[1,2-b]thiophene-2-acetic acid (from ethyl ester), analysis:

| | | | |
|---|---|---|---|
| calculated | C 60.0 | H 4.1 | S 10.0 % |
| found | C 59.9 | H 4.3 | S 10.2 % |

6-fluoro-4-oxo-4H-benzo[4,5]cyclohepta[1,2-b]thiophene-2-acetic acid (from ethyl ester), analysis:

| | | | |
|---|---|---|---|
| calculated | C 62.5 | H 9.1 | S 11.1 % |
| found | C 62.3 | H 9.0 | S 11.2 % |

9,10-dihydro-6-methoxy-4-oxo-4H-benzo[4,5]cyclohepta[1,2-b]thiophene-2-acetic acid (from methyl ester), analysis:

| | | | |
|---|---|---|---|
| calculated | C 67.2 | H 4.9 | S 11.2 % |
| found | C 67.4 | H 4.9 | S 11.1 % |

5-methyl-4-oxo-4H-benzo[4,5]cyclohepta[1,2-b]thiophene-2-acetic acid (from methyl ester), analysis:

| | | | |
|---|---|---|---|
| calculated | C 67.1 | H 4.9 | S 11.2 % |
| found | C 67.4 | H 5.0 | S 11.1 % |

EXAMPLE 16

6-chloro-9,10-dihydro-4-oxo-4H-benzo[4,5]cyclohepta[1,2-b]thiophene-2-acetic acid A solution of 4.3 g of 6-chloro-9,10-dihydro-4-oxo-4H-benzo[4,5]cyclohepta[1,2-b]thiophene-2-acetic acid methyl ester and 1.5 g of potassium hydroxide in 70 cc of dioxane and 35 cc of water is stirred at room temperature for 20 hours, is then diluted with 250 cc of water and washed out with benzene. After acidifying with concentrated hydrochloric acid, the precipitated product is extracted with chloroform, the extracts are washed with water, dried over magnesium sulphate, and the solvent is removed by evaporation. The title compound is crystallized from the residue with benzene/hexane. M.P. 142°–143°.

EXAMPLE 17

9,10-dihydro-α-methyl-4-oxo-4H-benzo[4,5]cyclohepta[1,2-b]thiophene-2-acetic acid A solution of 13.0 g of potassium hydroxide in 42 cc of water is added dropwise at room temperature to a solution of 16.0 g of 9,10-dihydro-α-methyl-4-oxo-4H-benzo[4,5]cyclohepta[1,2-b]thiophene-2-acetic acid ethyl ester in 400 cc of methanol, the resulting solution is stirred at 20° to 25° for 24 hours, 400 cc of water are added and the methanol is removed by evaporation. The aqueous solution is then washed with benzene, acidified with concentrated hydrochloric acid and extracted with chloroform. After drying over magnesium sulphate, the chloroform is removed by evaporation, and the resulting title compound is recrystallized from acetone/benzene. M.P. 118°–120°.

EXAMPLE 18

7-chloro-9,10-dihydro-4-oxo-4H-benzo[4,5]cyclohepta[1,2-b]thiophene-2-acetic acid This compound is produced in accordance with Example 17, from 9.0 g of 7-chloro-9,10-dihydro-4-oxo-4H-benzo[4,5]cyclohepta[1,2-b]thiophene-2-acetic acid ethyl ester and 6.9 g of potassium hydroxide in 225 cc of methanol and 20 cc of water. M.P. of the title compound 184°–185° (from benzene/acetone).

EXAMPLE 19

9,10-dihydro-α-methyl-4-oxo-4H-benzo[4,5]cyclohepta[1,2-b]thiophene-2-acetic acid ethyl ester [process variant b)]

A solution of 21.5 g of 9,10-dihydro-4-oxo-4H-benzo[4,5]cyclohepta[1,2-b]thiophene-2-acetic acid ethyl ester in 75 cc of benzene is added dropwise at room temperature to a suspension of 8.2 g of potassium tert.butylate in 50 cc of absolute ether, and stirring of the mixture is continued for 2 hours at room temperature. A solution of 11.5 g of methyl iodide in 50 cc of absolute ether is added dropwise at room temperature to the reaction mixture, stirring is continued for 1 hour, the mixture is poured on 300 cc of ice water and the organic phase is separated. The organic solution is washed with water, concentrated and dried over sodium sulphate, and the resulting title compound is purified by distillation.
B.P. 185°–190°/0.02 mm Hg.

What is claimed is:

1. A compound of the formula

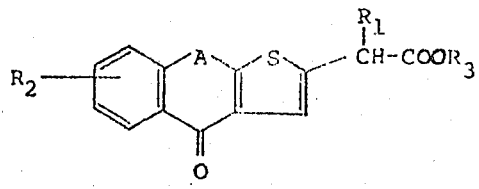

wherein
R₁ is hydrogen or lower alkyl,
R₂ is hydrogen, fluorine, chlorine, bromine, lower alkyl or lower alkoxy,
R₃ is hydrogen or lower alkyl, and
A is ethylene or vinylene, or, when R₃ is hydrogen a pharmaceutically acceptable salt thereof.

2. The compound of claim 1, which is 9,10-dihydro-4-oxo-4H-benzo[4,5]cyclohepta[1,2-b]thiophene-2-acetic acid.

3. The compound of claim 1, which is 4-oxo-4H-benzo[4,5]cyclohepta[1,2-b]thiophene-2-acetic acid.

4. The compound of claim 1, which is 6-chloro-9,10-dihydro-4-oxo-4H-benzo[4,5]cyclohepta[1,2-b]thiophene-2-acetic acid.

5. The compound of claim 1, which is 9,10-dihydro-α-methyl-4-oxo-4H-benzo[4,5]cyclohepta[1,2-b]thiophene-2-acetic acid.

6. The compound of claim 1, which is 7-chloro-9,10-dihydro-4-oxo-4H-benzo[4,5]cyclohepta[1,2-b]thiophene-2-acetic acid.

7. The compound of claim 1, which is 9,10-dihydro-α-methyl-4-oxo-4H-benzo[4,5]cyclohepta[1,2-b]thiophene-2-acetic acid ethyl ester.

8. The compound of claim 1, which is 9,10-dihydro-4-oxo-4H-benzo[4,5]cyclohepta[1,2-b]thiophene-2-acetic acid ethyl ester.

9. The compound of claim 1, which is 4-oxo-4H-benzo[4,5]cyclohepta[1,2-b]thiophene-2-acetic acid ethyl ester.

10. The compound of claim 1, which is 6-chloro-9,10-dihydro-4-oxo-4H-benzo[4,5]cyclohepta[1,2-b]thiophene-2-acetic acid ethyl ester.

11. The compound of claim 1, which is 6-chloro-9,10-dihydro-α-methyl-4-oxo-4H-benzo[4,5]cyclohepta[1,2-b]thiophene-2-acetic acid ethyl ester.

12. The compound of claim 1, which is 7-chloro-9,10-dihydro-4-oxo-4H-benzo[4,5]cyclohetpa[1,2-b]thiophene-2-acetic acid ethyl ester.

13. The compound of claim 1, which is 4-oxo-4H-benzo[4,5]cyclohepta[1,2-b]thiophene-2-acetic acid methyl ester.

14. The compound of claim 1, which is 6-chloro-9,10-dihydro-4-oxo-4H-benzo[4,5]cyclohepta[1,2-b]thiophene-2-acetic acid methyl ester.

15. A compound of claim 1, wherein R₁ is hydrogen or alkyl of 1 to 4 carbon atoms, R₂ is hydrogen, fluorine, chlorine, bromine, alkyl of 1 to 3 carbon atoms or alkoxy of 1 to 3 carbon atoms, R₃ is hydrogen or alkyl of 1 to 5 carbon atoms and A is ethylene or vinylene.

16. A compound of claim 15, wherein R₂ is hydrogen, fluorine, chlorine or bromine and R₃ is hydrogen.

17. A compound of claim 15, wherein R₃ is alkyl of 1 to 5 carbon atoms.

18. A compound of claim 1 wherein R₂ is hydrogen, fluorine, chlorine, bromine or lower alkoxy in the 6 or 7 position.

19. A compound of claim 18 wherein R₁ is lower alkyl having 1 to 4 carbon atoms.

20. A compound of claim 18 wherein R₂ is hydrogen.

21. The compound of claim 1 which is 6-chloro-9,10-dihydro-α-methyl-4-oxo-4H-benzo[4,5]cyclohepta[1,2-b]thiophene-2-acetic acid.

22. The compound of claim 1 which is 6-fluoro-4-oxo-4H-benzo[4,5]cyclohepta[1,2-b]thiophene-2-acetic acid.

23. The compound of claim 1 which is 5-methyl-4-oxo-4H-benzo[4,5]cyclohepta[1,2-b]thiophene-2-acetic acid.

24. The compound of claim 1, which is 6-fluoro-4-oxo-4H-benzo[4,5]cyclohepta[1,2-b]thiophene-2-acetic acid ethyl ester.

25. The compound of claim 1 which is 5-methyl-4-oxo-4H-benzo[4,5]cyclohepta[1,2-b]thiophene-2-acetic acid ethyl ester.

26. The compound of claim 1 which is 9,10-dihydro-6-methoxy-4-oxo-4H-benzo[4,5]cyclohepta[1,2-b]thiophene-2-acetic acid methyl ester.

27. The compound of claim 1 which is 6-fluoro-4-oxo-4H-benzo[4,5]cyclohepta[1,2-b]thiophene-2-acetic acid methyl ester.

28. The compound of claim 1 which is 5-methyl-4-oxo-4H-benzo[4,5]cyclohepta[1,2-b]thiophene-2-acetic acid methyl ester.

29. The compound of claim 1 which is 9,10-dihydro-6-methoxy-4-oxo-4H-benzo[4,5]cyclohepta[1,2-b]thiophene-2-acetic acid.

* * * * *